Dec. 8, 1959    M. HIRSCHEY    2,915,964
MARKING APPARATUS

Filed July 31, 1956    3 Sheets-Sheet 1

INVENTOR.
MALCOLM HIRSCHEY
BY
ATTORNEY.

Dec. 8, 1959  M. HIRSCHEY  2,915,964
MARKING APPARATUS
Filed July 31, 1956  3 Sheets-Sheet 2

INVENTOR.
MALCOLM HIRSCHEY
BY
ATTORNEY.

Dec. 8, 1959    M. HIRSCHEY    2,915,964
MARKING APPARATUS
Filed July 31, 1956    3 Sheets-Sheet 3

INVENTOR.
MALCOLM HIRSCHEY
BY
ATTORNEY

United States Patent Office 2,915,964
Patented Dec. 8, 1959

2,915,964

MARKING APPARATUS

Malcolm Hirschey, Woodbridge, N.J., assignor to Adolph Gottscho, Inc., Hillside, N.J., a corporation of New York Application July 31, 1956, Serial No. 601,183

14 Claims. (Cl. 101—44)

The present invention relates generally to marking apparatus, and more particularly is directed to apparatus for applying markings to conveyed articles.

In the application for United States Letters Patent filed September 15, 1955, by Malcolm Hirschey, Ira S. Gottscho and Andrew J. Alessi, Jr., and identified as Serial No. 534,496, an apparatus has been disclosed that is substantially portable and arranged so that it can be disposed at any desired location along an article conveyor to mark the successive articles conveyed by the latter without requiring the interruption of the article conveyor for accommodation of the marking apparatus. Such apparatus employs a single star wheel overlying the article handling conveyor, for example, a belt conveyor, and automatically serving to separate the conveyed articles and to carry the separated articles along a generally semi-circular path extending off the conveyor, past a marking station to one side of the latter where the bottom or top surfaces, or both the bottom and top surfaces, of the articles are marked and then back onto the uninterrupted article handling conveyor. In order that the marking apparatus may be easily positioned at any desired location along the article handling conveyor without requiring any substantial alteration or reworking of the latter for that purpose and will be ready for operation when so positioned, the marking apparatus is provided with its own drive means operating independently of the drive for the article handling conveyor or the drive for the machine feeding the article to be marked to the conveyor, for example, a machine filling cans, bottles or jars to be marked.

If an excessive build-up or backlog on the conveyor of articles waiting to be marked is to be avoided, the marking apparatus must operate at a speed or rate that is at least equal to the rate of delivery of the machine which feeds the articles to the conveyor. However, in many installations with which the described apparatus is intended to be used, the machine delivering articles to the conveyor is capable of operating at an extremely high rate of delivery, for example, at a rate as high as 600 articles per minute, during periods of peak loads, but, at other times, may deliver articles to the conveyor at a greatly reduced rate, for example, at a rate as low as 70 articles per minute. In that case, a marking apparatus of the described character operating independently of the actual rate of delivery of articles to be marked to the conveyor would have to operate at a rate equal to the maximum rate of delivery, even when the actual delivery rate was substantially lower, merely to ensure that the marking apparatus could mark all of the articles being delivered during the relatively infrequent periods of peak loads. It is apparent that the continuous operation of the marking apparatus at a speed capable of marking 600 articles per minute, when, in fact, only 70 articles per minute are being delivered to the conveyor, is extremely wasteful in that the marking apparatus will perform approximately 9 operating cycles for each article that is marked thereby and the wear on the marking apparatus will be correspondingly greater than is necessary.

Accordingly, it is an object of the present invention to provide apparatus for marking articles carried by an article handling conveyor, preferably apparatus of the described character, which, although driven independently of the drive of the conveyor and of the machine delivering the articles to be marked to the conveyor, responds to the presence or absence of a backlog of articles waiting to be marked on the conveyor to correspondingly speed up or slow down the rate of operation of the marking apparatus so that, during the periods of peak loads, the marking apparatus will operate at an accelerated rate to mark all of the articles delivered to the conveyor without causing the build-up of an excessive backlog of articles waiting to be marked on the conveyor, and during those periods when articles are delivered at a relatively slow rate, the operation of the marking apparatus will be correspondingly slowed down.

An aspect of the invention resides in the provision of marking apparatus of the described character with a variable speed drive and a control system for the latter including feeler means projecting into the path of the articles on the conveyor in advance of the location of the marking apparatus to be engaged by the conveyed articles, the control system being arranged so that when the feeler means is substantially continuously engaged, as by a backlog of articles waiting to be marked, the variable speed drive will be adjusted to speed up the operation of the marking apparatus, and, when the feeler means is disengaged from the articles or only sporadically engaged by spaced apart articles on the conveyor, the variable speed drive is adjusted in the opposite sense to slow down the operation of the marking apparatus.

In accordance with an embodiment of the invention, the foregoing object is achieved by providing a pneumatically operated, double acting cylinder having its plunger connected to the variable speed drive so that movement of the plunger, in one direction, causes speed-up of the operation of the marking apparatus, while movement of the plunger, in the opposite direction, causes slow down of the operation. The supplying of compressed air to the cylinder is controlled by an electromagnetically operated valve arrangement and the operation of the valve arrangement is, in turn, controlled by an electric circuit having switches therein actuable by a movable feeler arm urged to a position projecting into the path of articles on the conveyor. When the feeler arm projects into the path of the articles, the switches are disposed in positions corresponding to the movement of the plunger in said opposite direction. When the feeler arm is moved out of the path of the articles through engagement by the latter, the switches are actuated to dispose the valve arrangement for movement of the plunger in said one direction, that is, in the speed-up direction. However, the supplying or exhausting of compressed air through the valve arrangement, when the latter is so disposed, is metered to delay the movement of the plunger in the speed-up direction, so that actual speed-up of the operation of the marking apparatus occurs only when the feeler arm is held out of the path of the articles for a protracted period, as by engagement by a back log of articles waiting to be marked. When the feeler arm returns to its position projecting into the path of the articles, the switches are returned to their positions corresponding to the movement of the plunger in said opposite, slow down direction and such movement occurs rapidly to avoid any unnecessary operation of the marking apparatus at high speeds.

The above, and other, objects, features and advantages of the invention will be apparent in the following detailed description of an illustrative embodiment which is to be read in connection with the accompanying drawings forming a part hereof, and wherein.

Figure 1:
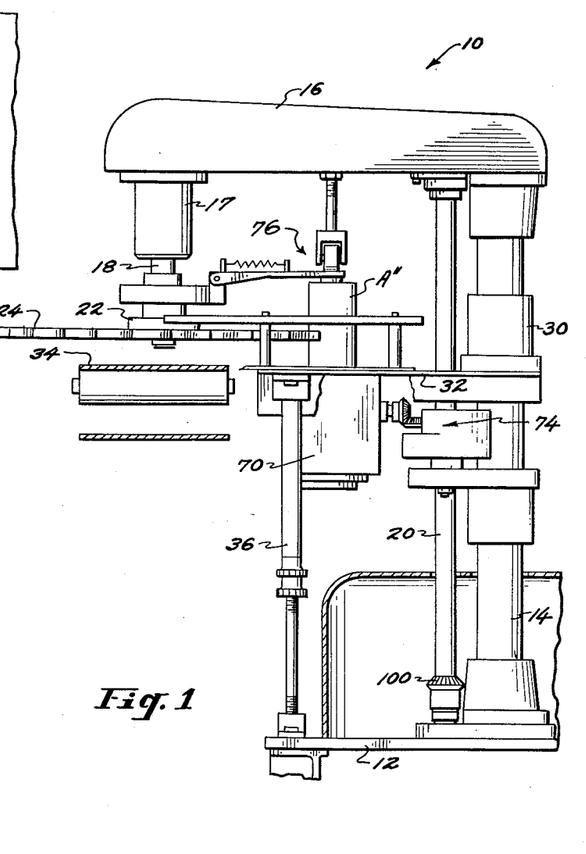
Fig. 1 is an elevational view of a marking apparatus of the kind to which the present application particularly relates.

Referring to the drawings in detail, and initially to Fig. 1 thereof, it will be seen that a marking apparatus to which the present invention may be applied, there generally identified by the reference numeral 10, includes a base 12 having an upstanding column 14 extending therefrom. A cantilevered arm structure 16 extends horizontally from the upper end of column 14 and, at its free end, supports a sleeve 17 in which a vertical spindle 18 is rotatably journalled. A drive shaft 20 extends parallel, and adjacent, to the column 14 and, at its lower and upper ends, is rotatably journalled in the base 12 and the arm structure 16, respectively. A suitable transmission (not shown), for example, a chain and sprocket drive, is provided within the arm structure 16 to rotate the spindle 18 in response to rotation of the drive shaft 20.

The lower portion of spindle 18 projects downwardly from sleeve 17 and has a hub 22 adjustable vertically thereon. A star wheel 24 (Figs. 1 and 2) is secured to the underside of the hub 22, and rotates, with the spindle 18, in the direction of the arrow 26 on Fig. 2. The star wheel 24 has a plurality of pockets or recesses 28 in the periphery thereof which open generally in the radial direction to receive the articles to be marked, it being understood that the form of such pockets depends upon, and is determined by, the form of the articles to be marked. Further, the number of pockets or recesses 28 can be varied depending upon the speed at which articles are to be marked, the speed of rotation of the star wheel, the size of the star wheel and the size of the articles to be marked.

A sleeve 30 is slidable vertically on the column 14 between the base 12 and the cantilevered arm structure 16, and a table structure 32 extends horizontally from the sleeve 30 in the same general direction as the arm structure 16. As seen in Fig. 1, the table structure 32 extends under the star wheel 24, with the free or projecting edge of the table structure being laterally spaced from the axis of rotation of the star wheel by a distance approximating one-half the lateral dimension of the conveyor 34 handling the articles to be marked. Thus, the marking apparatus 10, which may be made transportable by the provision of casters or the like (not shown) on the base 12, can be moved to an operative position anywhere along the conveyor 34 with the star wheel 24 then overlying the conveyor and having its axis of rotation substantially centered in the lateral direction relative to the conveyor, and with the table structure 32 extending along a side edge of an article carrying run of the conveyor 34 and being disposed at the same level as the latter.

As previously noted, the star wheel 24 is vertically adjustable along the spindle 18 for accommodating conveyors of various different heights therebelow, and the corresponding adjustments of the level of the table structure 32 are effected by adjustable jacks 36 extending vertically between the table structure and the base 12.

The apparatus 10 further has guides for directing the conveyed articles to a position where they are successively received in pockets 28 of the star wheel 24, for cooperating with the star wheel in causing the pocketed articles to move along a generally semi-circular path extending laterally off the conveyor 34, onto the table structure 32 and past a marking station on the latter, and for directing the marked articles back onto the conveyor 34. In order to accommodate such guides at the conveyor 34, sections of the usual lateral guides 38 and 40, at the opposite sides of the conveyor, are removed, and the removal of such sections of the lateral guides represents the only alteration of the existing conveyor structure necessary to permit installation of the marking apparatus 10 at a desired location along the conveyor.

The article guides of the apparatus 10 include a guide plate 42 (Fig. 2) interposed between the remaining sections of the conveyor guides 38 and having an arcuate edge 44 that is substantially concentric with the star wheel 24, an infeed guide 46 extending from the remaining section of the conveyor guide 40 at the entrance end of the apparatus 10, and an outlet guide 48 extending to the remaining section of the conveyor guide 40 at the opposite end of the marking apparatus. The confronting edges of the guide plate 42 and of the guides 46 and 48 are generally parallel and are arranged so that, as successive articles are moved by the conveyor 34 between the guides 38 and 40, each of the articles will enter between guide plate 42 and infeed guide 46 and be moved laterally thereby until taken up in a pocket 28 of the star wheel. When an article is received in a pocket 28, the edge 44 of guide plate 42 will hold the article against radial removal from the related pocket until the article passes between the guide plate 42 and the outlet guide 48 which together define a path tangential to the circular path of the pockets 28 and converging with the path of the conveyor 34 for returning the marked article to the latter.

Figures 2, 6, 7:
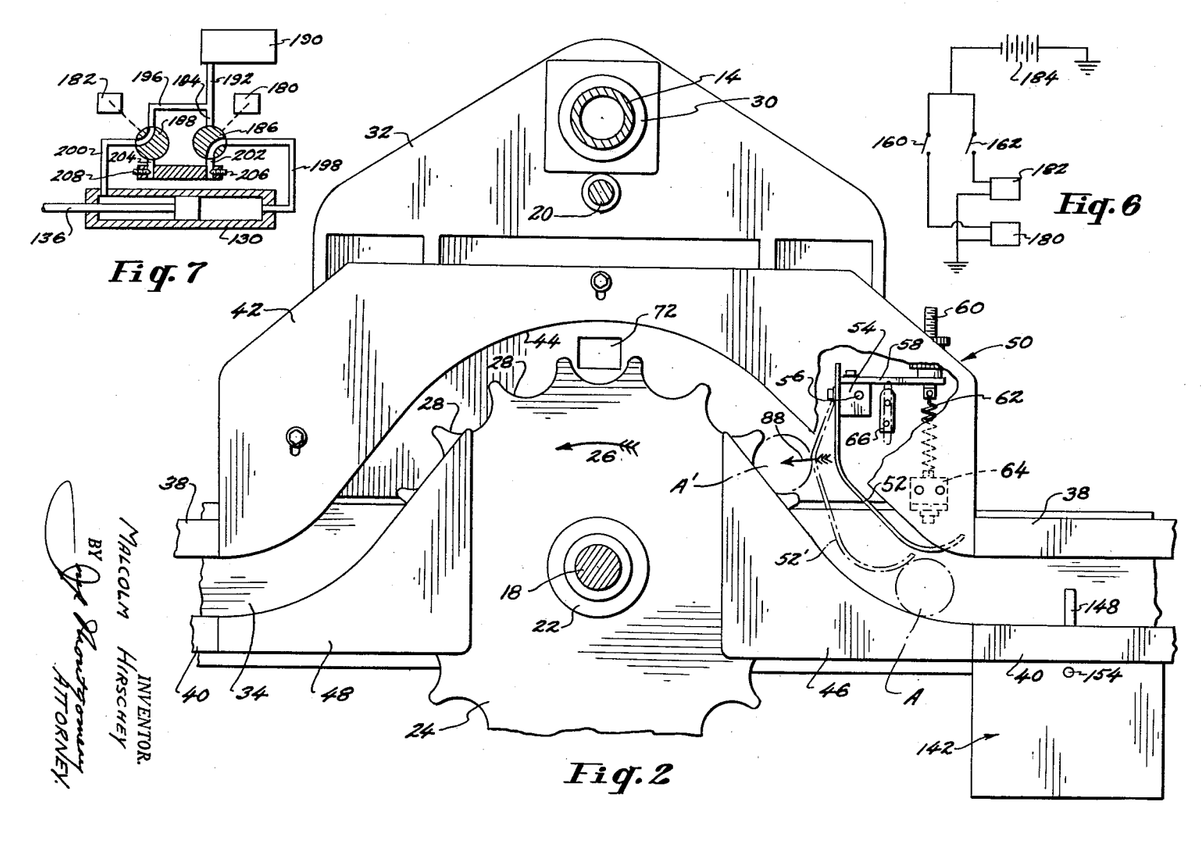
Fig. 2 is an enlarged plan view of the star wheel and article guides of a marking apparatus embodying the present invention.
Fig. 6 is a schematic wiring diagram of an electric circuit included in the illustrated embodiment of the invention.
Fig. 7 is a schematic view of a pneumatically operated control system included in the illustrated embodiment of the invention.

The reliable operation of the star wheel 24 in removing the foremost article to be marked from between the infeed guide 46 and the guide plate 42 requires a substantial pressure of the article against the periphery of the star wheel. Such pressure normally would result from the friction between the article and the continuously moving conveyor 34. When a backlog or accumulation of articles waiting to be marked is present at the infeed end of the apparatus, the frictional forces exerted by the conveyor 34 upon the accumulated articles are all applied to the foremost article, so that the pressure of the latter against the periphery of the star wheel may then be sufficient to ensure reliable operation of the latter. However, when the articles are spaced apart on the conveyor 34 and the star wheel 24 takes up the successive articles at a rate equal to, or greater than, the rate at which the articles are conveyed to the infeed end of the apparatus 10, there is no opportunity for a backlog of articles to accumulate between the infeed guide 46 and the guide plate 42 and the pressure of the foremost article against the periphery of the star wheel would then be determined only by the frictional force exerted by the conveyor on the single article. Such a relatively small frictional force could, on occasion, be too small to prevent the backward movement of the foremost article out of the pocket 28 or, more seriously, the jamming of the article between the edge 44 of guide plate 42 and the tooth-like projection of the star wheel between two adjacent pockets 28 of the latter.

In order to ensure that even stray conveyed articles will be firmly urged into empty pockets 28 of the star wheel 24 as such pockets move into the space between the guide plate 42 and infeed guide 46, the apparatus 10 is provided, in accordance with the present invention, with a device which is generally identified by the reference numeral 50 (Fig. 2) and which exerts a yieldable force upon each of the succesive articles in the direction toward the infeed guide 46 and toward the periphery of the star wheel 24. Preferably, in connection with the addition of the device 50, the lateral distance between the confronting edges of the infeed guide 46 and the guide plate 42 is opened up, that is, is made larger than the lateral dimension of the article to be guided therebetween. The device 50 includes an elongated, longitudinally bent member 52 supported, at one end, on a block 54 which is pivotally mounted, as at 56, below the guide plate 42 for swinging of the member 52 in a horizontal plane. An arm 58 also extends radially from the block 54 and, at its free end, has a bolt 60 extending therethrough to provide an adjustable anchor for one end of a spring 62 which has its opposite end connected to a bracket 64 (shown in broken lines) secured to the underside of the guide plate 42.

As seen in Fig. 2, the bent member 52 extends generally in the lateral direction from the block 54 into the space between the guide plate 42 and the infeed guide 46 and then along said space in the direction opposed to the direction of movement of the conveyed articles. The spring 62 urges the arm 58, block 54 and member 52 to rotate in the clockwise direction, as viewed in Fig. 2, that is, in the direction tending to move the free end of member 52 laterally across the path of the articles. Further, the device 50 includes an adjustable stop 66 held against the underside of guide plate 42 and engageable by the arm 58 to limit the movement of the free end of member 52 into the path of the conveyed articles so that, even when the member 52 is in its limited position, as represented by broken lines on Fig. 2, a conveyed article A entering the infeed end of the apparatus can act against the bent free end of the member 52 and push the latter to the side of the article.

It is apparent that, as an article passes between the guide plate 42 and the infeed guide 46, the member 52 acts laterally against the article to hold the latter against the guide 46. Further, if the conveyod article moving between the guide plate 42 and the infeed guide 46 is a substantial distance in advance of the next article on the conveyor, as in the case of the article A' in Fig. 2, as the article A' moves into a pocket 28 of the star wheel 24, the member 52 exerts a force on the article A' generally in the direction of the arrow 88 to ensure that the article will not back up out of the pocket and be jammed between the star wheel and the edge of guide plate 42.

The apparatus 10 further includes a marking device, generally identified by the reference numeral 70 (Fig. 1), which forms no part of the present invention, for applying suitable markings, for example, coded indications of the date of filling of a container or of the contents of the latter, as the successive articles pass the mid-point of the generally semi-circular path followed by the articles during their engagement by the star wheel 24. Although the device 70 is adapted for the marking of the bottom surfaces of the successive articles, it is to be understood that marking devices may be provided in apparatus embodying the present invention to mark the top surfaces, the top and bottom surfaces, the bottom and side surfaces, the top and side surfaces, on the top, bottom and side surfaces.

In order to provide for marking of the bottom surfaces of the successive articles, the table structure 32 has an opening 72 (Fig. 2) therein through which a rotated marking element of the device 70 can project when the latter is supported below the table structure, as in Fig. 1. Preferably, the marking device 70 is driven by a suitable transmission 74 from the drive shaft 20 so that the operation of the marking device will be synchronized with the rotation of the star wheel 24 to avoid blurring of the marked impressions. Further, as seen in Fig. 1, the apparatus 10 may include a hold-down arrangement 76 which engages each article A'' from above during the marking thereof to prevent tipping over of the article and to react against the upwardly directed marking pressure. The hold-down arrangement 76 also forms no part of the present invention and, therefore, will not be described in detail.

In accordance with this invention, marking apparatus of the above described type is provided with a drive arrangement which operates independently of the drive for the conveyor 34 and of the drive for the machine (not shown) delivering the articles to be marked to the conveyor, and which still accommodates the speed of operation of the marking apparatus to the rate at which the articles to be marked are delivered to the conveyor so that, in the event that the machine delivering the articles to the conveyor operates at an extremely high rate only during periods of peak loads and otherwise delivers the articles at a relatively slow rate, the marking apparatus can be speeded up to mark all of the delivered articles during such periods of peak loads and is otherwise operated at a relatively slow speed to prevent excessive wear of the marking apparatus and waste of the marking ink.

Figure 3:
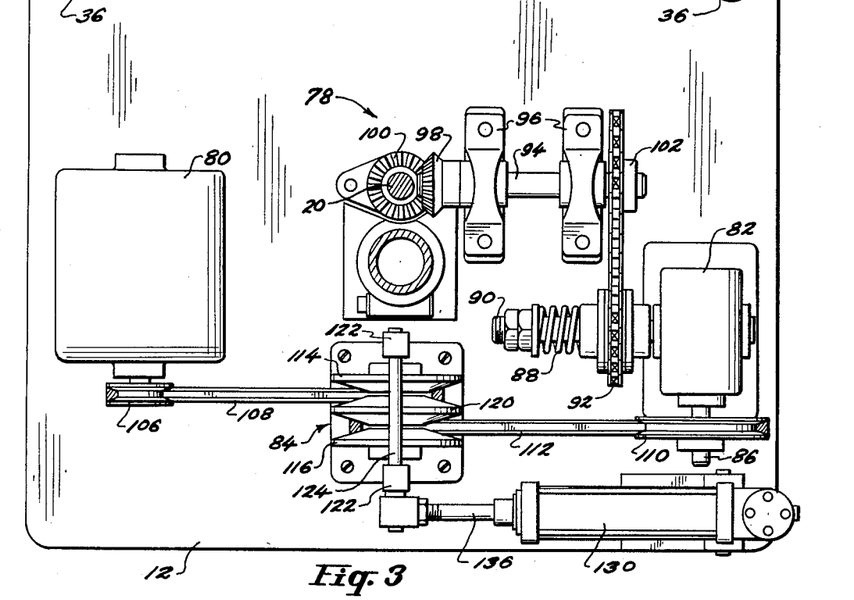
Fig. 3 is a plan view, on an enlarged scale of the drive assembly of a marking apparatus embodying the present invention.

In the illustrated embodiment of the invention, the drive arrangement (Figs. 3 and 4) for the marking apparatus 10 is generally identified by the reference numeral 78 and is mounted upon the base 12 so as to form an integral part of the marking apparatus. The drive arrangement 78 includes an electric motor 80, a speed reducing unit 82 and a variable speed transmission, generally identified by the reference numeral 84, which is interposed between the shaft of motor 80 and the input shaft 86 of the speed reducing unit. A yieldable coupling, for example, in the form of a friction clutch acted upon by a spring 88, normally transmits the rotation of the output shaft 90 of the speed reducing unit to a sprocket 92 on that shaft, but permits the independent rotation of the output shaft in the event that the star wheel encounters excessive resistance to its rotation. An intermediate shaft 94 is rotatably mounted in suitable bearing blocks 96 on the base 12 and, at one end, carries a bevel gear 98 which meshes with a bevel gear 100 on the lower end of drive shaft 20 (Figs. 1 and 3). At the end remote from bevel gear 98, the shaft 96 carries a sprocket 102 driven by a chain 104 running around the sprocket 92. Thus, the motor 80 serves to rotate the drive shaft 20 at a variable speed dependent upon the condition of the variable speed transmission 84.

Figure 4:
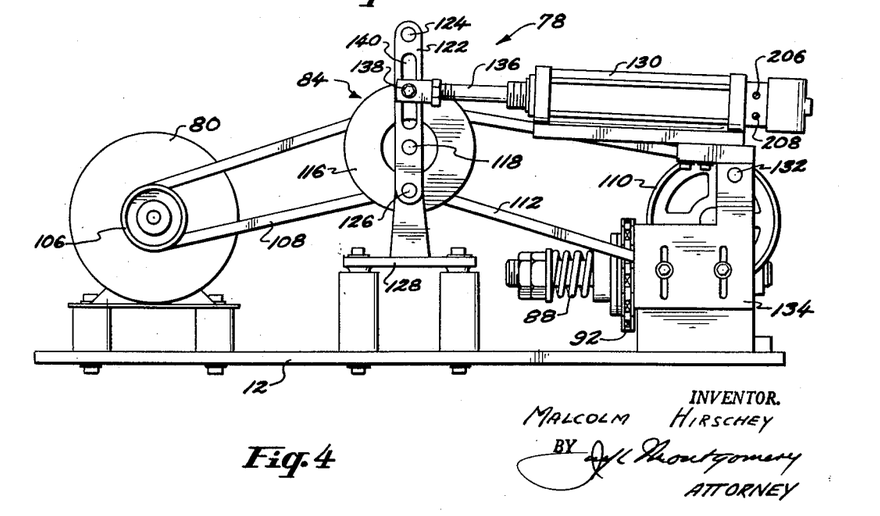
Fig. 4 is an elevational view of the drive assembly of Fig. 3.

As seen in Figs. 3 and 4, the variable speed transmission 84 may include a V-groove pulley 106 on the shaft of motor 80, a V-belt 108 extending around the pulley 106, a V-groove pulley 110 on the input shaft 86 of the speed reducing unit 82, a V-belt 112 extending around the pulley 110, and a double pulley made up of two sections 114 and 116 with confronting conical faces fixed on a shaft 118 in axially spaced apart relationship and a central section 120 having opposite conical faces. The central pulley section 120 is axially movable on the shaft 118 between the sections 114 and 116, but is constrained to rotate with the shaft 118, for example, by splines or by a key and slot arrangement (not shown). The V-belt 108 extends around the double pulley between the pulley sections 114 and 120, while the V-belt 112 extends around the double pulley between the pulley sections 116 and 120.

The shaft 118 is mounted in a swingable yoke including spaced apart side members 122 having the shaft 118 journalled intermediate the ends of the side members, and a cross-member 124 connecting the upper ends of the side members. The lower ends of the side members 122 are pivoted, as at 126, on a support 128 for swinging about a horizontal axis that is parallel to the axes of the motor shaft and the input shaft 86 of the speed reducing unit. In response to swinging of the side members 122, the axis of the shaft 118 is moved toward and away from the axes of the motor shaft and the input shaft of the speed reducing unit. When the axis of shaft 118 moves toward the shaft of motor 80, the distance between the shafts 118 and 86 is correspondingly increased. Since the belt 112 is of constant length, the increased interaxial distance is made possible by a decrease in the radius of the path of the belt 112 between the pulley sections 116 and 120, and the latter shifts axially toward the pulley section 114 to permit such decrease of radius. The slack in the belt 108 is taken-up by the axial movement of the pulley section 120 toward the pulley section 114 which serves to increase the radius of the path of the belt 108 between the pulley sections 114 and 120. Thus, when the shaft 118 moves toward the motor shaft, the variable speed transmission 84 decreases the rotational speed of the input shaft 86. Conversely, when the shaft 118 moves toward the input shaft 86 and away from the shaft of motor 80, the speed of the input shaft 86 is increased.

It is apparent from the above that the speed transmitted to the input shaft of the speed reducing unit 82, and hence the rotational speed of the star wheel 24, can be controlled by suitably rocking the side members 122 of the yoke in which the double pulley is rotatably mounted.

In the illustrated embodiment of the invention, rocking of the yoke carrying the double pulley is effected by a double-acting, pneumatically operated cylinder 130 which is pivotally mounted adjacent one end, as at 132, on a support bracket 134 carried by the base 12 (Fig. 4). A plunger 136 extends from the opposite or unsupported end of the cylinder 130 and, at its free end, is connected to one of the side members 122 by a bolt 138 adjustably received in a longitudinal slot 140 of the related side member. When the bolt 138 is loosened, the latter can be moved along the slot 140 thereby to vary the angular displacement of the yoke carrying the double pulley, and hence the change of speed, resulting from the movement of the plunger 136 between its fully extended and retracted positions. With the illustrated arrangement, extension of the plunger or ram 136 moves the shaft 118 toward the shaft of motor 80 and thereby decreases the transmitted speed, as explained above, while retraction of the plunger 136 conversely increases the transmitted speed.

In accordance with the present invention, the rotational speed of the star wheel 24, and hence the rate at which the apparatus 10 can mark the conveyed articles, is controlled by the presence or absence of a backlog of articles waiting to be marked at the infeed end of the marking apparatus. For this purpose, a feeler mechanism 142 (Figs. 2 and 5) is disposed adjacent the conveyor 34 at a location in advance of the infeed to the apparatus 10 defined by the guide plate 42 and the infeed guide 46 and is actuated by the conveyed articles to control the supplying of compressed air, or other pressure fluid, to the cylinder 130.

Figure 5:
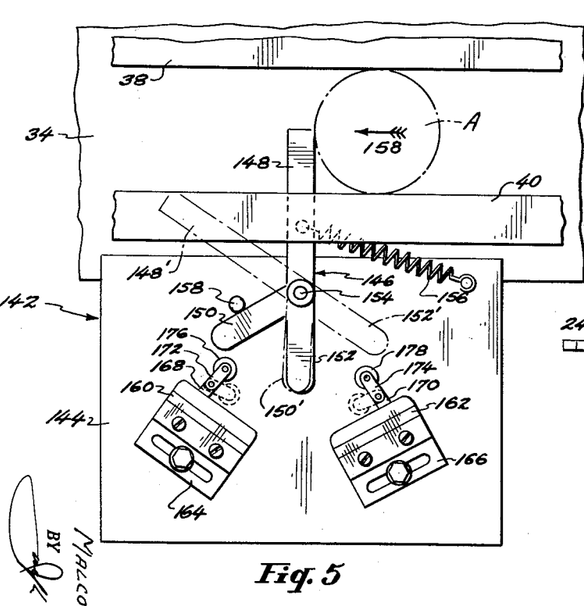
Fig. 5 is an enlarged plan view of a feeler assembly included in a marking apparatus embodying the present invention.

As seen particularly in Fig. 5, the feeler mechanism 142 includes a support plate 144 suitably mounted at one side of the conveyor 34. A generally Y-shaped feeler member 146 that includes a feeler arm 148 and diverging switch actuating arms 150 and 152 extending from one end of the arm 148 is pivotally mounted, at the junction of the arms 148, 150 and 152, on the support plate 144, as at 154. A spring 156 is connected between the feeler member 146 and the support plate 144 and yieldably urges the feeler member to pivot in the clockwise direction, as viewed in Fig. 5, to the position shown in full lines, where the feeler arm 148 projects laterally into the path of articles A carried by the conveyor 34 between the guides 38 and 40. A stop in 158 may project from the support plate 144 for engagement by the switch actuating arm 150, as shown, to limit the pivotal movement of the feeler member 146 under the influence of the spring 156.

It is apparent that, as an article A is moved by the conveyor 34 past the feeler mechanism in the direction of the arrow 158, such article engages the feeler arm 148 and pushes the latter out of the path of travel of the article, thereby pivoting the feeler arm and the switch actuating arms to the positions shown in broken lines and identified by the reference numerals 148', 150' and 152' on Fig. 5, and that, after the passage of the article and the disengagement by the latter of the feeler arm, the spring 156 returns the feeler member 146 to its original position.

The feeler mechanism 142 further includes microswitches 160 and 162 actuable by the arms 150 and 152, respectively. The switches 160 and 162 are carried by slotted brackets 164 and 166, respectively, which are secured to the support plate by bolts extending into the latter through the slots of the switch carrying brackets so that the switches 160 and 162 can be positionally adjusted along the arcuate path followed by the free ends of arms 150 and 152 during pivoting of the feeler member 146. The microswitches 160 and 162 are of the type having normally open contacts and have actuating fingers 168 and 170, respectively, extending therefrom to effect closing of the related contacts in response to rocking of the actuating fingers. Pivoted extensions 172 and 174 are provided on the fingers 168 and 170, respectively, and are yieldably urged, for example, by torsion springs (not shown) on the related pivots, to the illustrated full line positions where rollers 176 and 178 on the free ends of the extensions 172 and 174, respectively, project into the arcuate path of the ends of arms 150 and 152. The extension 172 is free to be rocked in the clockwise direction relative to the related finger 168 to the broken line position of Fig. 5, while the extension 174 is free to be rocked in the opposite or counter-clockwise direction relative to its finger 170 to the broken line position of Fig. 5.

Thus, when the feeler member 146 is rocked by an article to move the arms 150 and 152 to the broken line positions 150' and 152', the arm 150, in moving past the roller 176, merely rocks the extension 172 relative to the finger 168 and the contacts of switch 160 remain open, while the arm 152 engages the roller 178 and rocks the extension 174 and the finger 170 together to effect closing of the contacts of the related switch 162. On the other hand, when the spring 156 returns the feeler member 146 to its original position, the arm 152 merely rocks the extension 174 relative to the finger 170 to avoid reclosing of the contacts of switch 162, while the arm 150 engages the roller 176 in the direction causing joint rocking of the extension 172 and finger 168 to close the contacts of switch 160.

The switches 160 and 162 are employed to control the speeding-up and slowing-down of the rotation of the star wheel. For example, in the illustrated embodiment of the invention, the switches 160 and 162 may control the energization of electro-magnetically operated valves which, in turn, control the supplying of compressed air to the opposite ends of the cylinder 130.

Referring to Fig. 6, it will be seen that the switches 160 and 162 may be connected in series with solenoids 180 and 182, respectively, while the series connected switches and solenoids are connected in parallel between one side of a source 184 of electric current and ground, the other side of the source 184 being also grounded, as shown, so that the solenoids 180 and 182 are energized only when the contacts of the related normally open switches are closed in the manner described above.

As seen in Fig. 7, the solenoids 180 and 182 may be connected to two-position valves 186 and 188, respectively, to operate the latter. The valves 186 and 188 are interposed in a system for supplying compressed air to the cylinder 130 that includes a tank or other source 190 of compressed air, a supply line 192 extending from the tank 190 and opening into branches 194 and 196 leading to the valves 186 and 188, respectively, and lines or conduits 198 and 200 extending from the valves 186 and 188, respectively, to the opposite ends of the cylinder 130. Further, the illustrated system has vents 202 and 204 opening to atmosphere from the valves 186 and 188 and having adjustable metering valves 206 and 208 extending therein for varying the resistance to the flow of compressed air out of the vents.

Each of the control valves 186 and 188 is arranged to establish communication between the related vent and the related conduit 198 or 200 when the related solenoid is de-energized, for example, as in the case of the valve 186 on Fig. 7, and to establish communication between the related supply branch 194 or 196 and the related conduit 198 or 200 when the related solenoid is energized, for example, as in the case of the valve 188 on Fig. 7. Thus, when the solenoid 180 is energized by closing of switch 160, compressed air is fed to the right-hand end of cylinder 130, as viewed in Fig. 7, while the left-hand end of the cylinder is opened to the atmosphere to permit extension of the plunger or ram 136 for displacing the variable speed transmission 84 in the direction for decreasing the speed of rotation of the star wheel 24. On the other hand, when the solenoid 182 is energized by closing of switch 162, compressed air is fed to the left-hand end of cylinder 130 and the right-hand end of the latter is opened to the atmosphere to cause retraction of the plunger 136 for displacing the transmission 84 in the direction for increasing the speed of rotation of the star wheel.

Preferably, the metering valve 206 is adjusted to provide a relative small exhaust opening through the vent 202 so that, when compressed air is supplied in the direction for causing retraction of the plunger 136, such retraction will take place relatively slowly. Thus, when an isolated article passes the feeler mechanism 142 and causes the feeler member 146 to momentarily close the switch 162, the retraction of the ram 136 for causing a speed-up of the rotational speed of the star wheel 24 occurs slowly and, before such speed-up can become effective, the isolated article again releases the feeler member 146 which then closes switch 160 to cause the compressed air to be supplied to the cylinder 130 in the direction for extending the plunger 136 and correspondingly slowing down the rotational speed of the star wheel. Accordingly, actual speeding up of the rotational speed of the star wheel 24 will occur only when a back log of successive articles occurs on the conveyor 34 to repeatedly engage the feeler member 146 and thereby to cause repeated closing of the switch 162 without intervening closures of the switch 160.

It is apparent that, with the described arrangement, the operating speed of the marking apparatus 10 is automatically varied to accommodate the rate at which articles to be marked are delivered to the conveyor 34. Assuming that the star wheel 24 is initially turning at a relatively slow speed and that the machine delivering articles to the conveyor 34 then begins to deliver articles to be marked at an accelerated rate, the initial effect of such accelerated delivery will be the build-up of a backlog of articles waiting to be marked at the infeed end of the apparatus 10. When the backlog reaches a predetermined number, depending upon the location of the feeler mechanism in advance of the infeed to the apparatus 10, the described controls automatically operate to increase the rotational speed of the star wheel to an extent sufficient to make the operating speed of the apparatus 10 correspond to the accelerated rate of delivery. When the rate of delivery of articles to be marked to the conveyor is sharply reduced, for example, at the end of a period of peak production, the rotational speed of the star wheel is reduced quickly in response to the dissipation of the backlog of articles at the infeed end of the marking apparatus. Thus, the marking apparatus 10 can accommodate articles fed thereto at a high rate, but does not operate needlessly at such high rate when the rate of delivery is decreased.

Although the illustrated embodiment of the invention employs a constant speed electric motor and a variable speed transmission for controlling the operating speed of the marking apparatus, it is apparent that a variable speed motor or any other variable speed drive means could be employed for the same purpose and controlled in response to the presence or absence of a backlog of articles waiting to be marked in the manner described above.

Further, although a particular illustrative embodiment of the invention has been described in detail herein and shown in the accompanying drawings, it is to be understood that the invention is not limited to that particular embodiment, and that various changes and modifications may be effected in the latter without departing from the scope or spirit of the invention as defined in the appended claims.

What is claimed is:

1. In apparatus for marking successive articles conveyed thereto at a substantially constant speed and having an infeed at which articles to be marked are received at a variable rate; the combination of drive means for operating the marking apparatus at a variable rate, and control means actuated by the successive articles conveyed to the infeed to increase and decrease the speed at which said drive means operates the marking apparatus in response to the actuation of said control means by successive conveyed articles in closely spaced relationship and in relatively widely spaced relationship, respectively, so that, when articles are conveyed to the infeed at a rate higher than that at which the apparatus is operating to create an accumulation of closely spaced articles at the infeed, the rate of operation of the marking apparatus is increased and, when the marking apparatus is operating at a rate higher than that at which articles to be marked are conveyed to the infeed, the rate of operation of the marking apparatus is decreased.

2. In apparatus for marking successive articles conveyed thereto at a substantially constant speed and having an infeed at which articles to be marked are received at a variable rate; the combination of drive means for operating the marking apparatus at a variable speed, means for adjusting the speed at which said drive means operates the marking apparatus, and feeler means engageable by the successive articles conveyed to the infeed of the marking apparatus and controlling said adjusting means to cause the latter to increase the speed of operation of the marking apparatus when said feeler means is substantially continuously engaged by closely spaced articles waiting to be marked at the infeed of the apparatus, and to cause said adjusting means to decrease the speed of operation of the marking apparatus when said feeler means is only intermittently engaged by articles conveyed to the infeed in relatively widely spaced relationship.

3. In apparatus for marking successive articles conveyed thereto at a substantially constant speed and having an infeed at which articles to be marked are received at a variable rate; the combination of drive means for operating the marking apparatus at a variable speed, a feeler member yieldably urged to project into the path of the articles conveyed to the infeed and movable out of said path by engagement by a conveyed article, means for adjusting the speed at which said drive means operates the marking apparatus, control means for said adjusting means actuable by said feeler member to condition said adjusting means for increasing the speed at which the marking apparatus is operated in response to movement of said feeler member out of said path of the articles and to condition said adjusting means for decreasing the speed at which the marking apparatus is operated in response to the return movement of said feeler member into said path of the articles upon the release by the latter of said feeler member, and means delaying the action of said adjusting means in the sense causing increasing of the speed at which the marking apparatus is operated so that, when said feeler member is only intermittently engaged by spaced apart articles conveyed to the infeed and the speed of operation of the apparatus is adequate to mark the articles at the rate at which the latter are conveyed, speeding up of the operation of the marking apparatus is avoided, whereby speeding up of the operation of the marking apparatus occurs only when the feeler member is substantially continuously held out of the path of the conveyed articles by successive accumulated articles waiting to be marked at the infeed of the marking apparatus.

4. In apparatus for marking successive articles conveyed thereto at a substantially constant rate and having an infeed at which articles to be marked are received at a variable rate; the combination of drive means for operating the marking apparatus at a variable speed, a feeler member yieldably urged to project into the path of the articles conveyed to the infeed and movable out of said path by engagement by a conveyed article, means for adjusting the speed at which said drive means operates the marking apparatus, and control means for said adjusting means including first and second normally open switches actuable by said feeler member and closed in response to the movements of the latter into and out of, respectively, the path of the conveyed articles, and means causing said adjusting means to decrease the operating speed of the marking apparatus in response to closing of said first switch and to increase the operating speed of the marking apparatus in response to repeated closing of said second switch by engagement of said feeler member with a succession of conveyed articles accumulated at the infeed.

5. In apparatus for marking successive articles conveyed thereto at a substantially constant speed and having an infeed at which articles to be marked are received at a variable rate; the combination of drive means for operating the marking apparatus at a variable speed, pressure fluid operated motor means connected to said drive means for varying the speed at which the latter operates the marking apparatus, means for selectively supplying pressure fluid to opposed ends of said motor means to increase and decrease the speed of operation of the marking apparatus, and means controlling the supplying of pressure fluid to said motor means and actuated by the successive conveyed articles to supply pressure fluid to said motor means at one end for increasing the speed of operation when said controlling means is substantially continuously actuated by conveyed articles in closely spaced relationship waiting to be marked at the infeed of the apparatus, and to supply pressure fluid to the opposite end of the motor means for decreasing the speed of operation when said controlling means is only intermittently actuated by relatively widely spaced apart articles conveyed to the infeed.

6. In apparatus for marking successive articles conveyed thereto at a substantially constant speed and having an infeed at which articles to be marked are received at a variable rate; the combination of a substantially constant speed motor, variable transmission means driven by said motor for operating the marking apparatus at a variable speed, means for adjusting the transmission ratio of said variable transmission means including a pressure fluid operated cylinder having a ram movable in opposite directions to increase and decrease, respectively, the transmission ratio of said variable transmission means, means for suplying pressure fluid to said cylinder to selectively move said ram in said opposite directions, and control means for said pressure fluid supplying means actuated by the successive conveyed articles to cause the supplying of pressure fluid to said cylinder for moving said ram in the direction increasing said transmission ratio when said control means is substantially continuously actuated by conveyed articles in closely spaced relationship waiting to be marked at the infeed of the apparatus and for moving said ram in the opposite direction decreasing said transmission ratio when said control means is only intermittently actuated by articles conveyed to the infeed in relatively widely spaced apart relationship.

7. In apparatus for marking successive articles conveyed thereto at a substantially constant speed and having an infeed at which articles to be marked are received at a variable rate; the combination of a substantially constant speed motor, variable transmission means driven by said motor for operating the marking apparatus at a variable speed, means for adjusting the transmission ratio of said variable transmission means including a pressure fluid operated cylinder having a ram movable in opposite directions to increase and decrease, respectively, the transmission ratio of said variable transmission means, means for supplying pressure fluid to said cylinder to selectively move said ram in said opposite directions, a feeler member yieldably urged to normally project into the path of the articles conveyed to said infeed and movable out of said path by a conveyed article engaging the feeler member, and control means for said pressure fluid supplying means actuable by said feeler member to cause the movement of said ram in the direction increasing said transmission ratio in response to substantially continuous engagement of the feeler member by closely spaced apart conveyed articles waiting to be marked at the infeed of the apparatus and to cause movement of said ram in the direction decreasing the transmission ratio in response to the return of said feeler member to its normal projection into said path during the intervals between the engagement of the feeler member by successive conveyed articles in relatively widely spaced apart relationship.

8. In apparatus for marking successive articles conveyed thereto at a substantially constant rate and having an infeed at which articles to be marked are received at a variable rate; the combination of a substantially constant speed motor, variable transmission means driven by said motor for operating the marking apparatus at a variable speed, means for adjusting the transmission ratio of said variable transmission means including a pressure fluid operated cylinder having a ram movable in opposite directions to increase and decrease, respectively, the transmission ratio of said transmission means, means for supplying pressure fluid to said cylinder to selectively move said ram in said opposite directions, a feeler member yieldably urged to normally project into the path of the articles conveyed to said infeed and movable out of said path by a conveyed article engaging the feeler member, and control means for said pressure fluid supplying means actuable by said feeler member to cause the movement of said ram in the direction increasing said transmission ratio in response to the movement of said feeler member out of said path and to cause movement of said ram in the direction decreasing the transmission ratio in response to the return of said feeler member to its normal projection into said path, said pressure fluid supplying means including means for slowing the movement of said ram in said direction increasing the transmission ratio so that, when said feeler member is only intermittently engaged by spaced apart conveyed articles entering said infeed and moved repeatedly into and out of the path of the conveyed articles, said control means repeatedly reverses the direction of movement of said ram to prevent any overall movement of the latter in the direction increasing the transmission ratio.

9. In apparatus for marking successive articles conveyed thereto at a substantially constant speed and having an infeed at which articles to be marked are received at a variable rate; the combination of a constant speed motor, a driven shaft parallel to the motor shaft and connected to the apparatus for operating the latter, a variable speed transmission between said motor shaft and driven shaft including V-groove pulleys on said motor and driven shafts, an intermediate shaft parallel to said motor and driven shafts and movable toward and away from the latter, a double V-groove speed changing pulley on said intermediate shaft and V-belts extending around said speed changing pulley and said pulleys on the motor and driven shafts to oppositely vary the radii of the paths of said belts around said speed changing pulley in response to movement of said intermediate shaft toward and away from said motor and driven shafts thereby to change the speed at which the apparatus is operated, means for displacing said intermediate shaft toward and away from said motor and driven shafts, and control means actuated by the successive conveyed articles to cause said displacing means to move said intermediate shaft in the direction for increasing the operating speed of the apparatus when said control means is substantially continuously actuated by conveyed articles in closely spaced relationship waiting to be marked at said infeed, and to cause said displacing means to move said intermediate shaft in the direction for decreasing the operating speed of the apparatus when said control means is only intermittently actuated by articles conveyed to said infeed in relatively widely spaced apart relationship.

10. In apparatus for marking successive articles conveyed thereto at a substantially constant speed and having an infeed at which articles to be marked are received at a variable rate; the combination of a constant speed motor, a driven shaft parallel to the motor shaft and connected to the apparatus for operating the latter, a variable speed transmission between said motor shaft and driven shaft including V-groove pulleys on said motor and driven shaft, an intermediate shaft parallel to said motor and driven shafts and movable toward and away from the latter, a double V-groove speed changing pulley on said intermediate shaft and V-belts extending around said speed changing pulley and said pulleys on the motor and driven shafts to oppositely vary the radii of the paths of said belts around said speed changing pulley in response to movement of said intermediate shaft toward and away from said motor and driven shafts thereby to change the speed at which the apparatus is operated, a pressure fluid operated cylinder having a ram connected to said variable speed transmission and movable in opposite directions for displacing said intermediate shaft toward and away from said motor and driven shafts, and control means actuated by the articles conveyed to said infeed and controlling the supplying of pressure fluid to said cylinder so that, when said control means is substantially continuously actuated by closely spaced articles waiting to be marked at said infeed, said ram is moved in the direction for increasing the operating speed of the apparatus and, when said control means is only intermittently actuated by conveyed articles in relatively widely spaced relationship, said ram is moved in the direction for decreasing the operating speed of the apparatus.

11. In apparatus for marking successive articles conveyed thereto at a substantially constant speed and having an infeed at which articles to be marked are received at a variable rate; the combination as in claim 10, wherein said control means includes pressure fluid supplying means for selectively supplying pressure fluid to said cylinder to move said ram in said opposite directions, a feeler member yieldably urged to project into the path of the articles conveyed to said infeed and movable out of said path by the successive conveyed articles, and electro-magnetic means actuable by said feeler member and operating said pressure fluid supplying means to condition the latter for supplying pressure fluid to said cylinder to cause movement of said ram in the operating speed increasing direction when said feeler member is moved out of said path and to condition said pressure fluid supplying means for supplying pressure fluid to said cylinder to cause movement of said ram in the operating speed decreasing direction when said feeler member projects into said path.

12. In apparatus for marking successive articles conveyed thereto at a substantially constant speed and having an infeed at which the articles to be marked are received at a variable rate; the combination as in claim 11, wherein said control means further includes means operative to delay the movement of said ram in the operating speed increasing direction so that increasing of the operating speed is effected only when said feeler member is substantially continuously held out of said path of the articles by repeated engagement by successive articles in closely spaced relationship waiting to be marked at said infeed.

13. Apparatus for marking articles transported at a substantially constant speed and at a variable rate by an uninterrupted article handling conveyor; said apparatus comprising a supporting structure adapted to be positioned alongside the article handling conveyor and having an overhung upper structure to extend over the conveyor, a rotated star wheel depending from said overhung upper structure and rotating about a vertical axis extending into the path of the conveyed articles, said star wheel having peripheral pockets for receiving the successive conveyed articles, guides associated with said star wheel and operative to direct conveyed articles into said pockets for transport by the latter along a generally semi-circular path extending from the conveyor, laterally off one side of the latter and then back to the conveyor, yieldable means disposed at a fixed location adjacent the beginning of said generally semi-circular path and acting on the successive conveyed articles as the latter are directed by said guides and operative to force the foremost conveyed article into a pocket of said star wheel, marking means operative to apply markings to the successive articles in said pockets of the star wheel as the articles pass an intermediate location along said semi-circular path, drive means for operating said star wheel and said marking means at a variable speed, and control means actuated by the successive articles waiting to be marked on the conveyor and correspondingly controlling the speed at which said drive means operates the star wheel and marking means so that, when said control means is substantially continuously actuated by conveyed articles in closely spaced relationship, the operating speed is increased and, when said control means is only intermittently actuated by conveyed articles in relatively widely spaced apart relationship, the operating speed is decreased.

14. Apparatus for marking articles transported at a substantially constant speed and at a variable rate by an uninterrupted article handling conveyor; said apparatus comprising a supporting structure adapted to be positioned alongside the article handling conveyor and having an overhung upper structure to extend over the conveyor, a rotated star wheel depending from said overhung upper structure and rotating about a vertical axis extending into the path of the conveyed articles, said star wheel having peripheral pockets for receiving the successive conveyed articles, guides associated with said star wheel and operative to direct conveyed articles into said pockets for transport by the latter along a generally semi-circular path extending from the conveyor, laterally off one side of the latter and then back to the conveyor, marking means operative to apply markings to the successive articles in said pockets of the star wheel as the articles pass an intermediate location along said semi-circular path, drive means on said supporting structure for operating said star wheel and marking means at a variable speed, and controlling means actuated by the successive conveyed articles and correspondingly controlling said drive means to increase the operating speed of said star wheel and drive means in response to the substantially continuous actuation of said controlling means by closely spaced articles on the conveyor and to decrease the operating speed of said star wheel and drive means in response to the intermittent actuation of said controlling means by articles in relatively widely spaced relation on the conveyor.

References Cited in the file of this patent

UNITED STATES PATENTS

| | | |
|---|---|---|
| 1,023,074 | Gaynor et al. | Apr. 9, 1912 |
| 2,202,762 | Freed | May 28, 1940 |
| 2,354,040 | Molins et al. | July 18, 1944 |
| 2,407,899 | Nye et al. | Sept. 17, 1946 |
| 2,689,484 | Phares | Sept. 21, 1954 |
| 2,727,398 | Bowen | Dec. 20, 1955 |